United States Patent
Takada

(10) Patent No.: US 11,817,890 B2
(45) Date of Patent: Nov. 14, 2023

(54) RADIO-FREQUENCY MODULE AND COMMUNICATION DEVICE

(71) Applicant: Murata Manufacturing Co., Ltd., Kyoto (JP)

(72) Inventor: Atsushi Takada, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 720 days.

(21) Appl. No.: 17/007,329

(22) Filed: Aug. 31, 2020

(65) Prior Publication Data

US 2020/0403646 A1 Dec. 24, 2020

Related U.S. Application Data

(63) Continuation of application No. PCT/JP2018/047996, filed on Dec. 27, 2018.

(30) Foreign Application Priority Data

Mar. 1, 2018 (JP) .................................. 2018-037010

(51) Int. Cl.
*H04B 1/00* (2006.01)
*H04B 1/40* (2015.01)

(52) U.S. Cl.
CPC .............. *H04B 1/005* (2013.01); *H04B 1/40* (2013.01)

(58) Field of Classification Search
CPC .......... H04B 1/005; H04B 1/40; H04B 1/401; H04B 1/006
See application file for complete search history.

(56) References Cited

U.S. PATENT DOCUMENTS 6,389,269 B1 * 5/2002 Nanni .................. H04B 1/0458
455/552.1
8,107,890 B2 * 1/2012 Walley .................. H04W 72/51
370/465

(Continued)

FOREIGN PATENT DOCUMENTS

JP 2006129419 A 5/2006
JP WO2006112306 A1 * 10/2006

(Continued)

OTHER PUBLICATIONS

International Search Report issued in Application No. PCT/JP2018/047996, dated Feb. 26, 2019.

(Continued)

*Primary Examiner* — Lisa Hashem
(74) *Attorney, Agent, or Firm* — Pearne & Gordon LLP

(57) ABSTRACT

A radio-frequency module includes a first package where a first-transmitter circuit transmits a first transmit signal in a first transmit band based on a first communication standard and a first-receiver circuit receives a first receive signal in a first receive band based on the first communication standard, and a second package where a second-transmitter circuit transmits a second transmit signal in a second transmit band based on a second communication standard and a second-receiver circuit receives a second receive signal in a second receive band based on the second communication standard. In the first package, a third-receiver circuit receives a third receive signal in a third receive band based on a third communication standard and partially overlaps the first receive band. In the second package, the third-transmitter circuit transmits a third transmit signal in a third transmit band based on the third communication standard.

14 Claims, 3 Drawing Sheets

(56) References Cited

U.S. PATENT DOCUMENTS

| | | | |
|---|---|---|---|
| 8,892,159 B2 * | 11/2014 | Ganti | H04B 1/0053 |
| | | | 330/277 |
| 10,972,593 B1 * | 4/2021 | Sawada | H04M 1/0277 |
| 11,290,144 B2 * | 3/2022 | Yoshida | H04B 1/006 |
| 2003/0067997 A1 * | 4/2003 | Kintis | H04L 25/03038 |
| | | | 375/329 |
| 2003/0157912 A1 * | 8/2003 | Atkinson | H04B 1/006 |
| | | | 455/234.1 |
| 2005/0119025 A1 * | 6/2005 | Mohindra | H04B 1/0021 |
| | | | 455/88 |
| 2005/0197095 A1 | 9/2005 | Nakamata et al. | |
| 2008/0089397 A1 | 4/2008 | Vetter et al. | |
| 2009/0017772 A1 | 1/2009 | Kemmochi et al. | |
| 2012/0200354 A1 | 8/2012 | Ripley et al. | |
| 2013/0172056 A1 | 7/2013 | Kim | |

FOREIGN PATENT DOCUMENTS

| | | |
|---|---|---|
| JP | 2010507337 A | 3/2010 |
| JP | 2014505449 A | 2/2014 |
| WO | 2006112306 A1 | 10/2006 |

OTHER PUBLICATIONS

Written Opinion issued in Application No. PCT/JP2018/047996, dated Feb. 26, 2019.

* cited by examiner

FIG. 2A
FIG. 2B
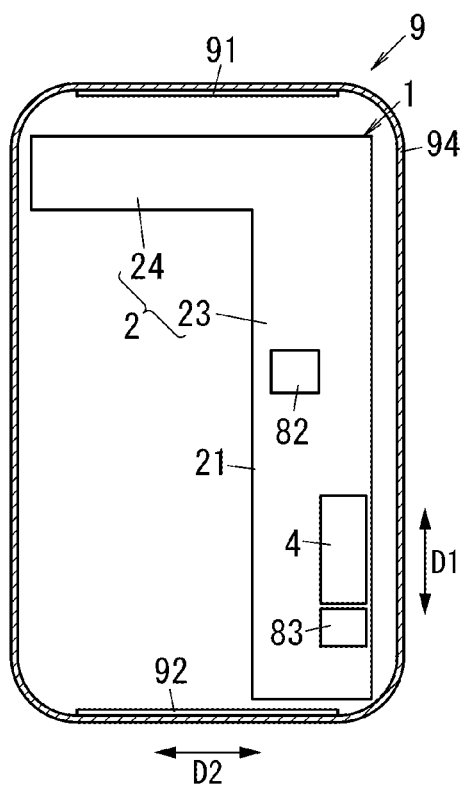
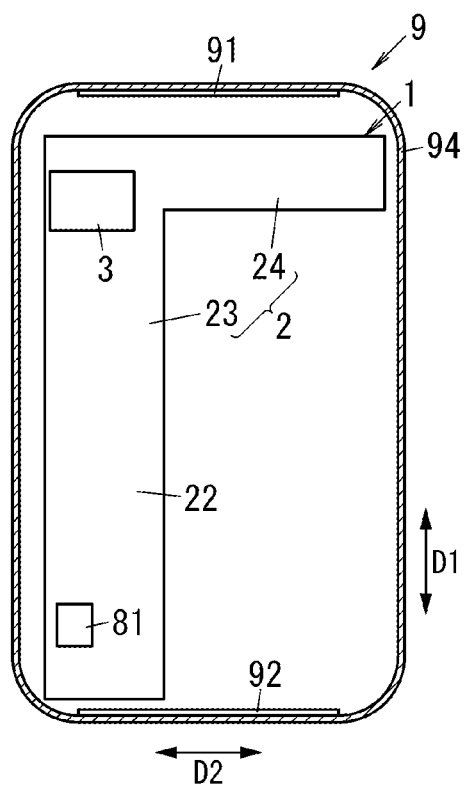

RADIO-FREQUENCY MODULE AND COMMUNICATION DEVICE

This is a continuation of International Application No. PCT/JP2018/047996 filed on Dec. 27, 2018 which claims priority from Japanese Patent Application No. 2018-037010 filed on Mar. 1, 2018. The contents of these applications are incorporated herein by reference in their entireties.

BACKGROUND

Technical Field

The present disclosure generally relates to radio-frequency modules and communication devices, and more particularly, to a radio-frequency module including a plurality of transmitter circuits and a communication device including this radio-frequency module.

Japanese Unexamined Patent Application Publication (Translation of PCT Application) No. 2010-507337 discloses a transceiver including a plurality of power amplifiers and a plurality of low-noise amplifiers. Each of the plurality of power amplifiers complies with a different communication standard. Similarly, each of the plurality of low-noise amplifiers complies with a different communication standard. Examples of the communication standard include wireless local area network (WLAN) standards, the Global System for Mobile Communications (GSM, registered trademark) standard, and the Universal Mobile Telecommunication System (UMTS) standard.

BRIEF SUMMARY

In a radio-frequency module known in the related art, which is included in a device, such as a transceiver described in Japanese Unexamined Patent Application Publication (Translation of PCT Application) No. 2010-507337, the frequency band used for communication and the electric power required for communication are different for each of the communication standards that differ from each other (for example, a first communication standard, a second communication standard, and a third communication standard).

If the frequency band of the first communication standard is close to the frequency band of the third communication standard, it is desirable to downsize circuits by operating a circuit for the first communication standard also as a circuit for the third communication standard (a first requirement).

If a large amount of electric power is necessary for transmission based on the second communication standard and for transmission based on the third communication standard, the current efficiency of a transmitter circuit needs to be increased to reduce the electric power consumed for communication (a second requirement). In such a case, a supply voltage controller that controls the supply voltage for the transmitter circuit may be used to increase the current efficiency of the transmitter circuit. Further, since a supply voltage controller generally involves high cost, a single supply voltage controller desirably functions for the transmitter circuit based on the second communication standard and for the transmitter circuit based on the third communication standard. Thus, the transmitter circuit based on the third communication standard is desirably disposed close to the transmitter circuit based on the second communication standard.

However, if one of the first and second requirements is prioritized over the other, the other requirement is not satisfied in a radio-frequency module known in the related art.

The present disclosure provides a radio-frequency module and a communication device that are capable of downsizing circuits and improving current efficiency of transmitter circuits at the same time.

A radio-frequency module according to an aspect of the present disclosure includes a first package and a second package. The second package differs from the first package. The first package includes a first-transmitter circuit and a first-receiver circuit. The first-transmitter circuit transmits a first transmit signal in a first transmit band based on a first communication standard. The first-receiver circuit receives a first receive signal in a first receive band based on the first communication standard. The second package includes a second-transmitter circuit and a second-receiver circuit. The second-transmitter circuit transmits a second transmit signal in a second transmit band based on a second communication standard. The second-receiver circuit receives a second receive signal in a second receive band based on the second communication standard. The first package further includes a third-receiver circuit. The third-receiver circuit receives a third receive signal based on a third communication standard, the third receive signal being in a third receive band that differs from the second receive band and that at least partially overlaps the first receive band. The second package further includes a third-transmitter circuit. The third-transmitter circuit transmits a third transmit signal in a third transmit band based on the third communication standard.

A radio-frequency module according to another aspect of the present disclosure includes a circuit board, a first-transmitter circuit, a first-receiver circuit, a second-transmitter circuit, a second-receiver circuit, a third-transmitter circuit, and a third-receiver circuit. The first-transmitter circuit includes at least one first-transmitter circuit element disposed in or on the circuit board and transmits a first transmit signal in a first transmit band based on a first communication standard. The first-receiver circuit includes at least one first-receiver circuit element disposed in or on the circuit board and receives a first receive signal in a first receive band based on the first communication standard. The second-transmitter circuit includes at least one second-transmitter circuit element disposed in or on the circuit board and transmits a second transmit signal in a second transmit band based on a second communication standard. The second-receiver circuit includes at least one second-receiver circuit element disposed in or on the circuit board and receives a second receive signal in a second receive band based on the second communication standard. The third-transmitter circuit includes at least one third-transmitter circuit element disposed in or on the circuit board and transmits a third transmit signal in a third transmit band based on a third communication standard. The third-receiver circuit includes at least one third-receiver circuit element disposed in or on the circuit board and receives a third receive signal in a third receive band based on the third communication standard. The third receive band differs from the second receive band and at least partially overlaps the first receive band. The at least one third-receiver circuit element, which is disposed in or on the circuit board, is disposed closer to a border region in which the at least one first-receiver circuit element is disposed than to a border region in which the at least one second-receiver circuit element is disposed. Alternatively, the at least one third-receiver circuit element is disposed in the border region in which the at least one first-receiver circuit element is disposed. The at least one third-transmitter circuit element, which is disposed in or on the circuit board, is disposed closer to a border region in which the at least one second-transmitter circuit element is disposed than to a border region in which the at least one first-transmitter circuit element is disposed. Alternatively, the at least one third-transmitter circuit element is disposed in the border region in which the at least one second-transmitter circuit element is disposed.

A communication device according to an aspect of the present disclosure includes one of the radio-frequency modules described above and a supply voltage controller. The supply voltage controller has a first function and a second function. The first function controls a supply voltage for the second-transmitter circuit in accordance with an amplitude level of the second transmit signal. The second function controls a supply voltage for the third-transmitter circuit in accordance with an amplitude level of the third transmit signal.

Circuits can be downsized, and current efficiency of transmitter circuits can be improved at the same time by using the radio-frequency module and the communication device according to the above aspects of the present disclosure.

Other features, elements, characteristics and advantages of the present disclosure will become more apparent from the following detailed description of embodiments of the present disclosure with reference to the attached drawings.

BRIEF DESCRIPTION OF THE SEVERAL VIEWS OF THE DRAWINGS

FIG. 2A is a front view of the radio-frequency module, and FIG. 2B is a rear view of the radio-frequency module.

DETAILED DESCRIPTION

Hereinafter, a radio-frequency module and a communication device according to a first embodiment and a second embodiment will be described with reference to the drawings. FIGS. 2A and 2B described in the following embodiments and the like provide schematic figures, and a ratio of a size or thickness of each element to a size or thickness of another element in the figures does not necessarily represent a ratio of an actual size or thickness.

First Embodiment (1) Radio-Frequency Module

First, an overall configuration of a radio-frequency module 1 according to a first embodiment will be described with reference to the drawings.

Figure 1:
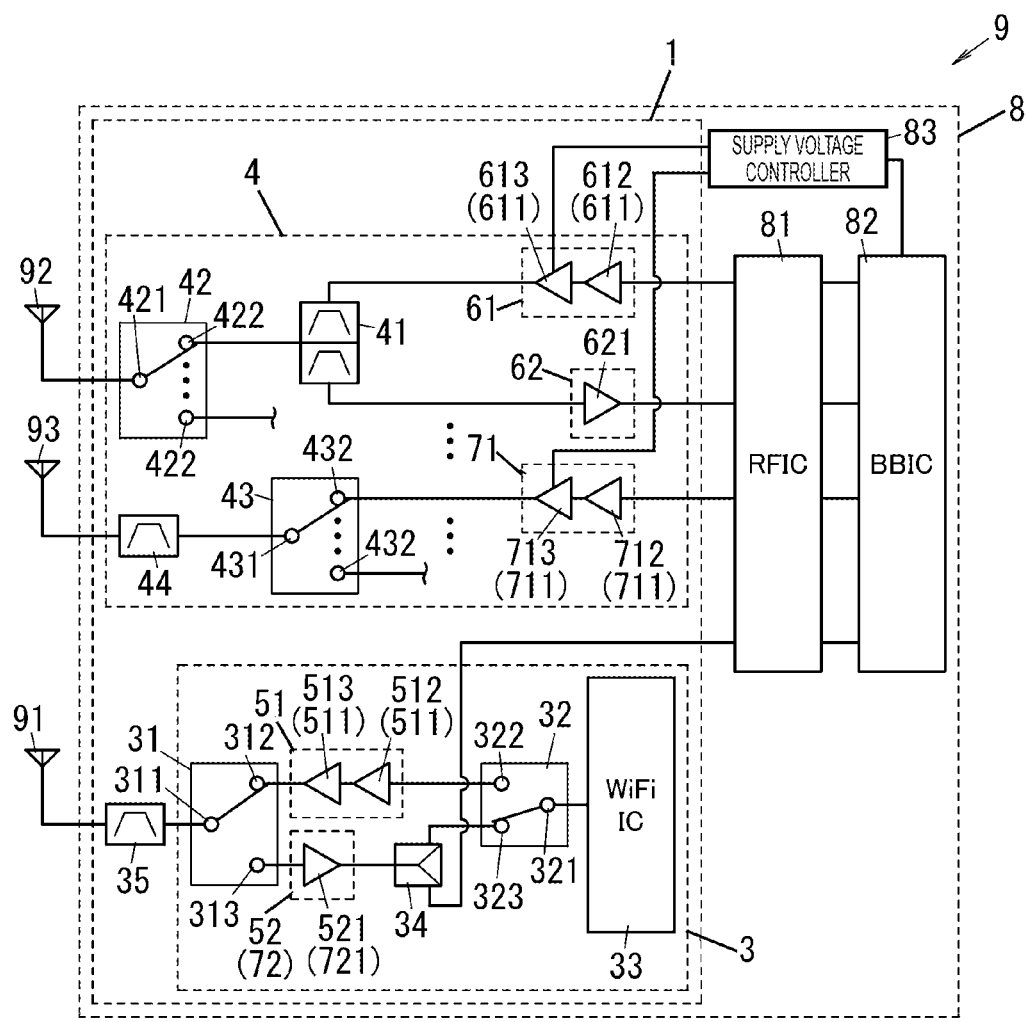
FIG. 1 is a circuit block diagram of a radio-frequency module according to a first embodiment of the present disclosure.

As depicted in FIG. 1, the radio-frequency module 1 according to the first embodiment includes a first package 3 and a second package 4. The second package 4 differs from the first package 3. In other words, the second package 4 has a configuration that differs from the configuration of the first package 3.

The first package 3 includes a first-transmitter circuit 51 and a first-receiver circuit 52. The first-transmitter circuit 51 transmits a first transmit signal in a first transmit band based on a first communication standard. The first-receiver circuit 52 receives a first receive signal in a first receive band based on the first communication standard.

The second package 4 includes a second-transmitter circuit 61 and a second-receiver circuit 62. The second-transmitter circuit 61 transmits a second transmit signal in a second transmit band based on a second communication standard. The second-receiver circuit 62 receives a second receive signal in a second receive band based on the second communication standard.

In the radio-frequency module 1 described above, the first package 3 further includes a third-receiver circuit 72. The third-receiver circuit 72 receives a third receive signal in a third receive band based on a third communication standard.

The second package 4 further includes a third-transmitter circuit 71. The third-transmitter circuit 71 transmits a third transmit signal in a third transmit band based on the third communication standard. The third transmit band differs from the second transmit band and at least partially overlaps the first transmit band.

The radio-frequency module 1 according to the first embodiment is used for an electronic device 9, such as a cellular phone including a smartphone as depicted in FIGS. 2A and 2B.

(2) Components in Radio-Frequency Module

Next, each component in the radio-frequency module 1 according to the first embodiment will be described with reference to the drawings.

As depicted in FIGS. 2A and 2B, the radio-frequency module 1 includes a circuit board 2, the first package 3, and the second package 4. The second package 4 differs from the first package 3. The first package 3 and the second package 4 are each a module in which power amplifiers (PAs), low-noise amplifiers (LNAs), filters, and other elements are disposed in or on a resin substrate or a ceramic substrate and encapsulated with resin.

(2.1) Circuit Board

As depicted in FIGS. 2A and 2B, the circuit board 2 is a mounted board, such as a printed-circuit board, and has a first main surface 21 and a second main surface 22. The circuit board 2 has a first portion 23 and a second portion 24 in plan view in the thickness direction of the circuit board 2. The first portion 23 has a shape elongated in a first direction D1. The first direction D1 is a longitudinal direction of the first portion 23. The second portion 24 has an elongated shape and is disposed so as to extend in a second direction D2 from an end portion of the first portion 23 in the first direction D1. The second direction D2 is a longitudinal direction of the second portion 24. The first portion 23 and the second portion 24 are seamlessly connected. The first direction D1 is perpendicular to the thickness direction of the circuit board 2. The second direction D2 is perpendicular to both the thickness direction of the circuit board 2 and the first direction D1.

(2.2) First Package

As depicted in FIG. 1, the first package 3 includes the first-transmitter circuit 51, the first-receiver circuit 52, a switch 31, and a switch 32. A filter 35 is connected to the first package 3.

As depicted in FIG. 1, the first-transmitter circuit 51 transmits the first transmit signal in the first transmit band based on the first communication standard. The first-transmitter circuit 51 includes a first power amplifier 511, which has a plurality of stages (two stages in the depicted example), and a power supply (not shown) for the first power amplifier 511. The first communication standard is, for example, the 5 GHz band of the Wi-Fi (registered trademark) standard. In this case, the first transmit band and the first receive band share the same frequency band. The first transmit band and the first receive band range from 4900 MHz to 5925 MHz.

The first power amplifier 511, which has a plurality of stages, amplifies the first transmit signal. The first power amplifier 511 has a first amplifier 512 and a final amplifier 513. The first amplifier 512 and the final amplifier 513 are connected in series. The output port of the first amplifier 512 is electrically connected to the final amplifier 513. The input port of the first amplifier 512 is electrically connected to a signal processing circuit 33 described below with the switch 32 interposed therebetween, and the first amplifier 512 receives the first transmit signal from the signal processing circuit 33. Then, the first amplifier 512, which is powered by a supply voltage from the power supply for the first power amplifier 511, amplifies the first transmit signal and outputs the amplified first transmit signal to the final amplifier 513. The final amplifier 513 receives the first transmit signal from the first amplifier 512. Subsequently, the final amplifier 513, which is powered by a supply voltage from the power supply for the first power amplifier 511, amplifies the first transmit signal and outputs the amplified first transmit signal to the filter 35 via the switch 31.

The first-receiver circuit 52 receives the first receive signal in the first receive band based on the first communication standard. The first-receiver circuit 52 includes a low-noise amplifier 521.

The low-noise amplifier 521 amplifies the first receive signal. The input port of the low-noise amplifier 521 is electrically connected to the switch 31, and the output port of the low-noise amplifier 521 is electrically connected to the signal processing circuit 33 with a splitter 34 and the switch 32 interposed therebetween. The low-noise amplifier 521 receives the first receive signal, which is received by a first antenna 91, via the filter 35 and the switch 31. Then, the low-noise amplifier 521 amplifies and outputs the first receive signal to the signal processing circuit 33 via the splitter 34 and the switch 32.

The switch 31 has a common terminal 311 and a plurality of selection terminals 312 and 313. The common terminal 311 is electrically connected to the first antenna 91 with the filter 35 interposed therebetween. The selection terminal 312 is electrically connected to the first-transmitter circuit 51, and the selection terminal 313 is electrically connected to the first-receiver circuit 52. The switch 31 selects a selection terminal that is to be connected to the common terminal 311 from the plurality of selection terminals 312 and 313. In other words, the switch 31 electrically connects one of the first-transmitter circuit 51 and the first-receiver circuit 52 to the first antenna 91 with the filter 35 interposed therebetween.

The switch 32 has a common terminal 321 and a plurality of selection terminals 322 and 323. The common terminal 321 is electrically connected to the signal processing circuit 33. The selection terminal 322 is electrically connected to the first-transmitter circuit 51, and the selection terminal 323 is electrically connected to the first-receiver circuit 52. The switch 32 selects a selection terminal that is to be connected to the common terminal 321 from the plurality of selection terminals 322 and 323. In other words, the switch 32 electrically connects one of the first-transmitter circuit 51 and the first-receiver circuit 52 to the signal processing circuit 33.

The signal processing circuit 33 has a function of outputting the first transmit signal based on the first communication standard to the first-transmitter circuit 51 and a function of receiving the first receive signal based on the first communication standard from the first-receiver circuit 52. The signal processing circuit 33 is an integrated circuit (IC) that processes a signal based on, for example, the Wi-Fi (registered trademark) standard.

The splitter 34 is electrically connected to the low-noise amplifier 521, the switch 32, and a radio-frequency (RF) signal processing circuit 81. The splitter 34 branches a receive signal from the low-noise amplifier 521 (the first receive signal and the third receive signal) into the first receive signal and the third receive signal.

The filter 35 has filter characteristics having a pass band including the first transmit band of the first transmit signal. The filter 35 passes the first transmit signal from the first-transmitter circuit 51. After passing through the filter 35, the first transmit signal is output to the first antenna 91. Then, the first antenna 91 radiates the first transmit signal as a wireless signal. The filter 35 also has filter characteristics having a pass band including the first receive band of the first receive signal. The filter 35 passes the first receive signal from the first antenna 91. After passing through the filter 35, the first receive signal is output to the first-receiver circuit 52.

As depicted in FIG. 2B, the first package 3 is mounted on the second main surface 22 of the circuit board 2. For example, the first package 3 is disposed in the first portion 23 of the circuit board 2. More specifically, the first package 3 is disposed close to a portion in the first portion 23 of the circuit board 2, where the second portion 24 seamlessly connects with the first portion 23.

(2.3) Second Package

As depicted in FIG. 1, the second package 4 includes the second-transmitter circuit 61, the second-receiver circuit 62, a demultiplexer 41, and a switch 42.

The second-transmitter circuit 61 transmits the second transmit signal in the second transmit band based on the second communication standard. The second-transmitter circuit 61 includes a second power amplifier 611, which has a plurality of stages (two stages in the depicted example), and a power supply (not shown) for the second power amplifier 611.

The first transmit band differs from the second transmit band. More specifically, the first communication standard is the Wi-Fi (registered trademark) standard with the first transmit band being the 5 GHz band. The second communication standard is a wireless mobile communication standard based on cellular technology. Examples of the wireless mobile communication standard include the second generation mobile communication standard (2G standard), the third generation mobile communication standard (3G standard), the fourth generation mobile communication standard (4G standard), and the fifth generation mobile communication standard (5G standard). The 4G standard and the 5G standard have been established by the 3rd Generation Partnership Project (3GPP).

The second power amplifier 611, which has a plurality of stages, amplifies the second transmit signal. The second power amplifier 611 has a first amplifier 612 and a final amplifier 613. The first amplifier 612 and the final amplifier 613 are connected in series. The output port of the first amplifier 612 is electrically connected to the final amplifier 613. The input port of the first amplifier 612 is electrically connected to the radio-frequency signal processing circuit 81 described below, and the first amplifier 612 receives the second transmit signal from the radio-frequency signal processing circuit 81. Then, the first amplifier 612, which is powered by a supply voltage from the power supply for the second power amplifier 611, amplifies the second transmit signal and outputs the amplified second transmit signal to the final amplifier 613. The final amplifier 613 receives the second transmit signal from the first amplifier 612. Subsequently, the final amplifier 613, which is powered by a supply voltage from the power supply for the second power amplifier 611, amplifies the second transmit signal and outputs the amplified second transmit signal to the demultiplexer 41.

The second-receiver circuit 62 receives the second receive signal in the second receive band based on the second communication standard. The second receive band differs from the first receive band. The second-receiver circuit 62 includes a low-noise amplifier 621.

The low-noise amplifier 621 amplifies the second receive signal. The input port of the low-noise amplifier 621 is electrically connected to the demultiplexer 41, and the output port of the low-noise amplifier 621 is electrically connected to the radio-frequency signal processing circuit 81. The low-noise amplifier 621 receives the second receive signal, which is received by a second antenna 92, via the demultiplexer 41. Then, the low-noise amplifier 621 amplifies and outputs the second receive signal to the radio-frequency signal processing circuit 81.

The demultiplexer 41 is disposed between the second antenna 92 and the second-transmitter and second-receiver circuits 61 and 62 with the switch 42 interposed between the second antenna 92 and the demultiplexer 41 and is configured to separate the second transmit signal and the second receive signal.

The switch 42 has a common terminal 421 and a plurality of selection terminals 422. One of the plurality of selection terminals 422 is electrically connected to the demultiplexer 41. The switch 42 selects from the plurality of selection terminals 422 a selection terminal that is to be connected to the common terminal 421.

As depicted in FIG. 2A, the second package 4 is mounted on the first main surface 21 of the circuit board 2. For example, the second package 4 is disposed in the first portion 23 of the circuit board 2. More specifically, the second package 4 is disposed close to an end portion in the first direction D1 in the first portion 23 of the circuit board 2, the end portion being located at the other end of the first portion 23 from the end portion where the second portion 24 seamlessly connects with the first portion 23. In other words, the second package 4 is located at the opposite end from the first package 3 (refer to FIG. 2B) in the first direction D1.

(2.4) Third-Transmitter Circuit and Third-Receiver Circuit

As depicted in FIG. 1, in the radio-frequency module 1 as described above, the first package 3 includes the third-receiver circuit 72, and the second package 4 includes the third-transmitter circuit 71. The second package 4 further includes a switch 43 and a filter 44.

The third-receiver circuit 72 receives the third receive signal in the third receive band based on the third communication standard. The third receive band differs from the second receive band and at least partially overlaps the first receive band. The third-receiver circuit 72 includes a low-noise amplifier 721. In the present embodiment, the first-receiver circuit 52 also functions as the third-receiver circuit 72. The low-noise amplifier 521 also functions as the low-noise amplifier 721.

The filter 35, which has been described above, has filter characteristics having a pass band including not only the first transmit band and the first receive band but also the third receive band. The filter 35 passes the third receive signal from the first antenna 91. After passing through the filter 35, the third receive signal is output to the third-receiver circuit 72. Then, the third receive signal is output to the radio-frequency signal processing circuit 81 via the splitter 34.

The third-transmitter circuit 71 transmits the third transmit signal in the third transmit band based on the third communication standard. The third transmit band differs from the second transmit band and at least partially overlaps the first transmit band. The third-transmitter circuit 71 includes a third power amplifier 711, which has a plurality of stages (two stages in the depicted example), and a power supply (not shown) for the third power amplifier 711. The third communication standard is, for example, the enhanced Licensed Assisted Access (eLAA) standard. The communication band of the eLAA standard ranges from 5150 MHz to 5850 MHz. If the first communication standard is the 5 GHz band of the Wi-Fi standard and the third communication standard is the eLAA standard, all of the third transmit band overlaps the first transmit band.

The third power amplifier 711, which has a plurality of stages, amplifies the third transmit signal. The third power amplifier 711 has a first amplifier 712 and a final amplifier 713. The first amplifier 712 and the final amplifier 713 are connected in series. The output port of the first amplifier 712 is electrically connected to the final amplifier 713. The input port of the first amplifier 712 is electrically connected to the radio-frequency signal processing circuit 81 described below, and the first amplifier 712 receives the third transmit signal from the radio-frequency signal processing circuit 81. Then, the first amplifier 712, which is powered by a supply voltage from the power supply for the third power amplifier 711, amplifies and outputs the third transmit signal to the final amplifier 713. The final amplifier 713 receives the third transmit signal from the first amplifier 712. Subsequently, the final amplifier 713, which is powered by a supply voltage from the power supply for the third power amplifier 711, amplifies and outputs the third transmit signal to the filter 44 via the switch 43.

The maximum electric power of the second power amplifier 611 and the maximum electric power of the third power amplifier 711 are greater than the maximum electric power of the first power amplifier 511.

The distance between the third power amplifier 711 and the second power amplifier 611 is shorter than the distance between the third power amplifier 711 and the first power amplifier 511. As depicted in FIG. 1, the first power amplifier 511 is included in the first package 3, and the second power amplifier 611 and the third power amplifier 711 are included in the second package 4. As depicted in FIGS. 2A and 2B, the first package 3 and the second package 4 are separately disposed. Thus, in the example in FIGS. 2A and 2B, the distance between the third power amplifier 711 and the second power amplifier 611 is also shorter than the distance between the third power amplifier 711 and the first power amplifier 511.

The switch 43 has a common terminal 431 and a plurality of selection terminals 432. One of the plurality of selection terminals 432 is electrically connected to the third-transmitter circuit 71. The switch 43 selects from the plurality of selection terminals 432 a selection terminal that is to be connected to the common terminal 431.

The filter 44 has filter characteristics having a pass band including the third transmit band of the third transmit signal. The filter 44 passes the third transmit signal from the third-transmitter circuit 71. After passing through the filter 44, the third transmit signal is output to a third antenna 93. Then, the third antenna 93 radiates the third transmit signal as a wireless signal.

(3) Communication Device

As depicted in FIG. 1, a communication device 8 includes the radio-frequency signal processing circuit 81, a baseband signal processing circuit 82, and a supply voltage controller 83 in addition to the radio-frequency module 1.

(3.1) Radio-Frequency Signal Processing Circuit

As depicted in FIG. 1, the radio-frequency signal processing circuit 81 is, for example, a radio-frequency integrated circuit (RFIC) and is disposed between the radio-frequency module 1 and the baseband signal processing circuit 82. The radio-frequency signal processing circuit 81 has a function of performing signal processing on the second transmit signal from the baseband signal processing circuit 82 and a function of performing signal processing on the second receive signal from the second-receiver circuit 62. Further, the radio-frequency signal processing circuit 81 has a function of performing signal processing on the third transmit signal from the baseband signal processing circuit 82. The radio-frequency signal processing circuit 81 is a processing circuit capable of handling a plurality of bands and can generate and amplify transmit signals in a plurality of communication bands (transmit bands).

As depicted in FIG. 2B, the radio-frequency signal processing circuit 81 is mounted on the circuit board 2. More specifically, the radio-frequency signal processing circuit 81 is disposed in the first portion 23 of the circuit board 2. The radio-frequency signal processing circuit 81 is disposed close to an end portion in the first direction D1 in the first portion 23 of the circuit board 2, the end portion being located at the other end of the first portion 23 from the end portion that connects with the second portion 24. In other words, the radio-frequency signal processing circuit 81 is disposed separately from the first package 3 in the first direction D1 and close to the second package 4 in the thickness direction of the circuit board 2.

(3.2) Baseband Signal Processing Circuit

As depicted in FIG. 1, the baseband signal processing circuit 82 is, for example, a baseband integrated circuit (BBIC) and is electrically connected to the radio-frequency signal processing circuit 81. The baseband signal processing circuit 82 generates an I-phase signal and a Q-phase signal from a baseband signal. The baseband signal processing circuit 82 combines the I-phase signal and the Q-phase signal to perform IQ modulation and outputs a transmit signal. The transmit signal is generated as a modulated signal obtained by amplitude modulation of a carrier-wave signal having a predetermined frequency, the cycle period of the modulation being longer than the cycle period of the carrier-wave signal. The baseband signal processing circuit 82 outputs the transmit signal not only to the second-transmitter circuit 61 or the third-transmitter circuit 71 but also to the supply voltage controller 83.

The baseband signal processing circuit 82 also performs digital pre-distortion (DPD) processing. More specifically, the baseband signal processing circuit 82 stores frequency-component compensation data to compensate for distortion that originates in the supply voltage controller 83. The baseband signal processing circuit 82 reads the frequency-component compensation data and generates the I-phase signal and the Q-phase signal so as to compensate for distortion in advance. Performing the DPD processing can eliminate or reduce the frequency component in the receive band (frequency component of the receive signal) included in the transmit signal.

As depicted in FIG. 2A, the baseband signal processing circuit 82 is mounted on the circuit board 2. More specifically, the baseband signal processing circuit 82 is disposed in the first portion 23 of the circuit board 2. The baseband signal processing circuit 82 is disposed near the center of the first portion 23 of the circuit board 2 in the first direction D1.

(3.3) Supply Voltage Controller

As depicted in FIG. 1, the supply voltage controller 83 receives the transmit signal from the baseband signal processing circuit 82 and controls the supply voltage for the transmitter circuits (the second-transmitter circuit 61 and the third-transmitter circuit 71) in accordance with the amplitude level of the transmit signal. The supply voltage controller 83 is an envelope-tracking (ET) modulator that uses the envelope-tracking method. The supply voltage controller 83 improves power efficiency (current efficiency) by controlling the supply voltage by using the envelope-tracking method.

For example, if the first communication standard is the 5 GHz band of the Wi-Fi (registered trademark) standard, the second communication standard is a wireless mobile communication standard using cellular technology, and the third communication standard is the eLAA standard, the second-transmitter circuit 61 based on the second communication standard and the third-transmitter circuit 71 based on the third communication standard require electric power higher than the electric power required by the first-transmitter circuit 51 based on the first communication standard. Thus, the second-transmitter circuit 61 and the third-transmitter circuit 71 need to be controlled by a supply voltage controller, which involves high cost. To cope with this issue, as depicted in FIG. 1, the second-transmitter circuit 61 and the third-transmitter circuit 71 are controlled by a single supply voltage controller, which is the supply voltage controller 83. Details of operation of the supply voltage controller 83 will be described herein.

The supply voltage controller 83 detects an envelope of a transmit signal that is output from the baseband signal processing circuit 82. In other words, the supply voltage controller 83 detects a waveform (envelope signal) of the amplitude-modulated carrier-wave signal that forms a transmit signal. Specifically, the supply voltage controller 83 detects and obtains envelope signals from an I-phase signal and a Q-phase signal.

The supply voltage controller 83 determines the supply voltage by using the envelope signal (waveform of the amplitude-modulated carrier-wave signal) and a predetermined amplification factor. The cycle period of the supply voltage is the same as the cycle period of the envelope signal. The amplitude variation of the supply voltage is the same as the amplitude variation of the envelope signal. In other words, the amplitude characteristics (cycle period and amplitude variation) are the same for the envelope signal and for the supply voltage. The supply voltage controller 83 applies the supply voltage to the power amplifiers (the second power amplifier 611 and the third power amplifier 711).

As described above, the supply voltage controller 83 performs amplification processing, which is based on the envelope tracking performed on the transmit signal.

The supply voltage controller 83 has a first function of controlling the supply voltage for the second-transmitter circuit 61 in accordance with the amplitude level of the second transmit signal. More specifically, the supply voltage controller 83 determines the supply voltage to be applied to the final amplifier 613 of the second-transmitter circuit 61 in accordance with the information regarding the second transmit signal from the baseband signal processing circuit 82 and controls the supply voltage for the final amplifier 613.

The supply voltage controller 83 also has a second function of controlling the supply voltage for the third-transmitter circuit 71 in accordance with the amplitude level of the third transmit signal. More specifically, the supply voltage controller 83 determines the supply voltage to be applied to the final amplifier 713 of the third-transmitter circuit 71 in accordance with the information regarding the third transmit signal from the baseband signal processing circuit 82 and controls the supply voltage for the final amplifier 713.

If the supply voltage controller 83 is disposed at a long distance from the power amplifiers (the second power amplifier 611 and the third power amplifier 711), the waveform of a tracking signal deviates from the waveform of the transmit signal from the power amplifiers, and thus tracking sometimes cannot precisely be performed.

Thus, the geometric distances between the supply voltage controller 83 and the power amplifiers need to be short. If the supply voltage controller 83 is installed to control the supply voltage for the second-transmitter circuit 61 by design, the second-transmitter circuit 61 is disposed close to the supply voltage controller 83. Further, if the supply voltage controller 83 is used not only to control the supply voltage for the second-transmitter circuit 61 but also to control the supply voltage for the third-transmitter circuit 71, the third-transmitter circuit 71 is desirably disposed close to the supply voltage controller 83.

Specifically, the distance between the supply voltage controller 83 and the third power amplifier 711 is shorter than the distance between the supply voltage controller 83 and the first power amplifier 511. As depicted in FIG. 1, the first power amplifier 511 is included in the first package 3, and the third power amplifier 711 is included in the second package 4. As depicted in FIGS. 2A and 2B, the supply voltage controller 83 is disposed closer to the second package 4 than to the first package 3. In this way, in the example in FIGS. 2A and 2B, the distance between the supply voltage controller 83 and the third power amplifier 711 is also shorter than the distance between the supply voltage controller 83 and the first power amplifier 511.

The supply voltage controller 83 may be a module constituted by a plurality of circuit elements or may be an IC.

(4) Electronic Device

As depicted in FIG. 1, the electronic device 9 includes the communication device 8, the first antenna 91, the second antenna 92, and the third antenna 93. As depicted in FIGS. 2A and 2B, the electronic device 9 further includes a casing 94.

As depicted in FIG. 1, the first antenna 91 is electrically connected to both the first-transmitter circuit 51 and the first-receiver circuit 52 with the filter 35 and the switch 31 interposed therebetween. The first antenna 91 is used for first communication based on the first communication standard.

Since the first-receiver circuit 52 also functions as the third-receiver circuit 72, the first antenna 91 is used not only as a receive antenna for the first communication based on the first communication standard but also as a receive antenna for third communication based on the third communication standard.

As depicted in FIGS. 2A and 2B, the first antenna 91 is disposed along the inner surface of an end portion of the casing 94 in the first direction D1. In other words, the first antenna 91 is disposed at a position closer to the first package 3 than to the second package 4 in the casing 94.

As depicted in FIG. 1, the second antenna 92 is electrically connected to both the second-transmitter circuit 61 and the second-receiver circuit 62 with the switch 42 and the demultiplexer 41 interposed therebetween. The second antenna 92 is used for second communication based on the second communication standard.

As depicted in FIGS. 2A and 2B, the second antenna 92 is disposed along the inner surface of an end portion of the casing 94 in the first direction D1. In other words, the second antenna 92 is disposed at a position closer to the second package 4 than to the first package 3 in the casing 94.

As depicted in FIG. 1, the third antenna 93 is electrically connected to the third-transmitter circuit 71 with the filter 44 and the switch 43 interposed therebetween. The third antenna 93 is a transmit antenna used for the third communication based on the third communication standard.

(5) Advantageous Effects

As described above, in the radio-frequency module 1 according to the first embodiment, the first package 3 includes the third-receiver circuit 72, which receives the third receive signal in the third receive band that at least partially overlaps the first receive band, along with the first-receiver circuit 52, which receives the first receive signal in the first receive band. Consequently, since the first-receiver circuit 52 can also function as the third-receiver circuit 72, the circuit can be downsized.

In the radio-frequency module 1 according to the first embodiment, the second package 4 includes the third-transmitter circuit 71, which transmits the third transmit signal, along with the second-transmitter circuit 61, which transmits the second transmit signal. Consequently, since the second-transmitter circuit 61 and the third-transmitter circuit 71 can share the supply voltage controller 83, the current efficiency of the transmitter circuits can be improved. In other words, the current efficiency of the second-transmitter circuit 61 and the third-transmitter circuit 71 can be improved. For example, the supply voltage controller 83 controls the supply voltage for the third-transmitter circuit 71 in accordance with the amplitude level of the third transmit signal, and the distance between the supply voltage controller 83 and the third-transmitter circuit 71 can be reduced. Thus, waveform rounding of the amplitude waveform of the supply voltage from the supply voltage controller 83 can be reduced with respect to the amplitude waveform of the third transmit signal, and a time lag between the two waveforms can also be reduced. Consequently, the supply voltage provided for the third transmit signal can more precisely be controlled by the supply voltage controller 83.

Further, if the second-transmitter circuit 61 based on the second communication standard and the third-transmitter circuit 71 based on the third communication standard require electric power higher than the electric power required by the first-transmitter circuit 51 based on the first communication standard, the second-transmitter circuit 61 and the third-transmitter circuit 71 need to be controlled by a supply voltage controller, which involves high cost. Thus, the second-transmitter circuit 61 and the third-transmitter circuit 71 are desirably controlled by a single supply voltage controller, which is the supply voltage controller 83. Encasing the third-transmitter circuit 71 together with the second-transmitter circuit 61 in the second package 4 makes it easy to manage the second-transmitter circuit 61 and the third-transmitter circuit 71 by using a single supply voltage controller, which is the supply voltage controller 83.

Second Embodiment

Figure 3:
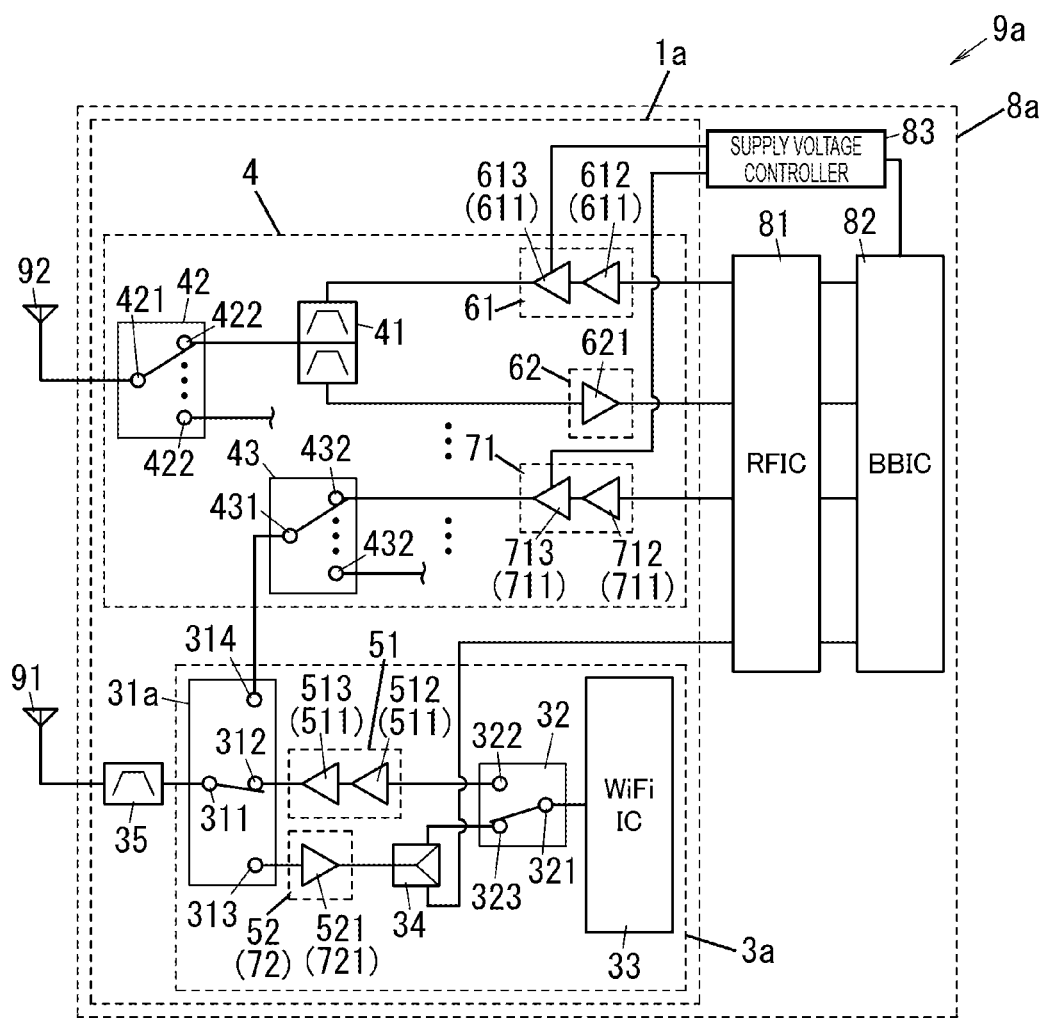
FIG. 3 is a circuit block diagram of a radio-frequency module according to a second embodiment of the present disclosure.

A radio-frequency module 1a according to a second embodiment differs from the radio-frequency module 1 according to the first embodiment (refer to FIG. 1) in that the radio-frequency module 1a includes a switch 31a as depicted in FIG. 3. Concerning the radio-frequency module 1a according to the second embodiment, elements that are the same as or similar to those of the radio-frequency module 1 according to the first embodiment are denoted by the same numerals or symbols and will not be described.
(1) Configuration The radio-frequency module 1a according to the second embodiment includes a first package 3a. The first package 3a includes the switch 31a as depicted in FIG. 3 instead of the switch 31 in the first embodiment (refer to FIG. 1).

The switch 31a switches between connection and disconnection between the input port (input port in transmission) of the filter 35 and the output port (output port in transmission) of the third-transmitter circuit 71. The switch 31a has a common terminal 311 and a plurality of selection terminals 312, 313, and 314. The common terminal 311 is electrically connected to the first antenna 91 with the filter 35 interposed therebetween. The selection terminal 312 is electrically connected to the first-transmitter circuit 51, and the selection terminal 313 is electrically connected to the first-receiver circuit 52. The selection terminal 314 is electrically connected to the common terminal 431 of the switch 43. In other words, the selection terminal 314 is electrically connected to the third-transmitter circuit 71 with the switch 43 interposed therebetween. The switch 31a selects a selection terminal that is to be connected to the common terminal 311 from the plurality of selection terminals 312, 313, and 314. In other words, the switch 31a electrically connects one of the first-transmitter circuit 51, the first-receiver circuit 52, and the third-transmitter circuit 71 to the first antenna 91 with the filter 35 interposed therebetween. Concerning the switch 31a according to the second embodiment, configurations and functions that are the same as or similar to those of the switch 31 according to the first embodiment will not be described.

The filter 35 according to the second embodiment has filter characteristics having a pass band including not only the first transmit band, the first receive band, and the third receive band but also the third transmit band. The filter 35 passes the third transmit signal from the third-transmitter circuit 71. After passing through the filter 35, the third transmit signal is output to the first antenna 91. In short, the third transmit signal from the third-transmitter circuit 71 is output to the first antenna 91 via the switch 31a and the filter 35. Then, the first antenna 91 radiates the third transmit signal as a wireless signal.

Similarly to the radio-frequency module 1 according to the first embodiment, the radio-frequency module 1a according to the second embodiment is used, for example, for a communication device 8a and an electronic device 9a, such as a cellular phone including a smartphone.
(2) Advantageous Effects As described above, in the radio-frequency module 1a according to the second embodiment, a single antenna can function for the first communication standard and for the third communication standard while the supply voltage controller 83 controls the supply voltage for the third-transmitter circuit 71. Consequently, the third antenna 93 (refer to FIG. 1) need not be installed separately from the first antenna 91 and the second antenna 92, and the removal of the third antenna 93 can be achieved.

Further, similarly to the radio-frequency module 1 according to the first embodiment (refer to FIG. 1), in the radio-frequency module 1a according to the second embodiment, since the first-receiver circuit 52 based on the first communication standard can also function as the third-receiver circuit 72 based on the third communication standard, the circuits can be downsized. In addition, the second package 4 includes the third-transmitter circuit 71 based on the third communication standard along with the second-transmitter circuit 61 based on the second communication standard. Consequently, since the second-transmitter circuit 61 and the third-transmitter circuit 71 can share the supply voltage controller 83, the current efficiency of the transmitter circuits (current efficiency of the second-transmitter circuit 61 and the third-transmitter circuit 71) can be improved.

Modifications

As a modification to the first and second embodiments, a radio-frequency module, which is not depicted, may have a structure in which a plurality of discrete elements, instead of packages, are disposed in or on a circuit board.

A radio-frequency module according to the present modification includes a circuit board, a first-transmitter circuit, a first-receiver circuit, a second-transmitter circuit, a second-receiver circuit, a third-transmitter circuit, and a third-receiver circuit.

The first-transmitter circuit includes a plurality of first-transmitter circuit elements disposed in or on the circuit board and transmits the first transmit signal in the first transmit band based on the first communication standard. The first-receiver circuit includes a plurality of first-receiver circuit elements disposed in or on the circuit board and receives the first receive signal in the first receive band based on the first communication standard.

In a configuration that includes a plurality of first-transmitter circuit elements, a border region in which at least one first-transmitter circuit element is disposed refers to a region whose area is the largest of all the regions enclosed by lines connecting the plurality of first-transmitter circuit elements, that is, lines connecting outermost boundaries of the plurality of first-transmitter circuit elements. In other words, the border region in which the at least one first-transmitter circuit element is disposed includes not only regions in which the first-transmitter circuit elements are disposed but also the surrounding regions. Similarly, in a configuration that includes a plurality of first-receiver circuit elements, a border region in which at least one first-receiver circuit element is disposed refers to a region whose area is the largest of all the regions enclosed by lines connecting outermost boundaries of the plurality of first-receiver circuit elements. In other words, the border region in which the at least one first-receiver circuit element is disposed includes not only regions in which the first-receiver circuit elements are disposed but also the surrounding regions.

The second-transmitter circuit includes a plurality of second-transmitter circuit elements disposed in or on the circuit board and transmits the second transmit signal in the second transmit band based on the second communication standard. The second-receiver circuit includes a plurality of second-receiver circuit elements disposed in or on the circuit board and receives the second receive signal in the second receive band based on the second communication standard.

In a configuration that includes a plurality of second-transmitter circuit elements, a border region in which at least one second-transmitter circuit element is disposed refers to a region whose area is the largest of all the regions enclosed by lines connecting outermost boundaries of the plurality of second-transmitter circuit elements. In other words, the border region in which the at least one second-transmitter circuit element is disposed includes not only regions in which second-transmitter circuit elements are disposed but also the surrounding regions. Similarly, in a configuration that includes a plurality of second-receiver circuit elements, a border region in which at least one second-receiver circuit element is disposed refers to a region whose area is the largest of all the regions enclosed by lines connecting outermost boundaries of the plurality of second-receiver circuit elements. In other words, the border region in which the at least one second-receiver circuit element is disposed includes not only regions in which second-receiver circuit elements are disposed but also the surrounding regions.

The third-transmitter circuit includes a plurality of third-transmitter circuit elements disposed in or on the circuit board and transmits the third transmit signal in the third transmit band based on the third communication standard. The third-receiver circuit includes a plurality of third-receiver circuit elements disposed in or on the circuit board and receives the third receive signal in the third receive band based on the third communication standard. The third transmit band differs from the second transmit band and at least partially overlaps the first transmit band. The third receive band differs from the second receive band and at least partially overlaps the first receive band.

In a configuration that includes a plurality of third-transmitter circuit elements, a border region in which at least one third-transmitter circuit element is disposed refers to a region whose area is the largest of all the regions enclosed by lines connecting outermost boundaries of the plurality of third-transmitter circuit elements. In other words, the border region in which the at least one third-transmitter circuit element is disposed includes not only regions in which third-transmitter circuit elements are disposed but also the surrounding regions. Similarly, in a configuration that includes a plurality of third-receiver circuit elements, a border region in which at least one third-receiver circuit element is disposed refers to a region whose area is the largest of all the regions enclosed by lines connecting outermost boundaries of the plurality of third-receiver circuit elements. In other words, the border region in which the at least one third-receiver circuit element is disposed includes not only regions in which third-receiver circuit elements are disposed but also the surrounding regions.

In the radio-frequency module according to the present modification, the third-receiver circuit elements, which are disposed in or on the circuit board, are disposed closer to the border region in which the at least one first-receiver circuit element is disposed than to the border region in which the at least one second-receiver circuit element is disposed. In contrast, the third-transmitter circuit elements, which are disposed in or on the circuit board, are disposed closer to the border region in which the at least one second-transmitter circuit element is disposed than to the border region in which the at least one first-transmitter circuit element is disposed.

The radio-frequency module according to the above modification also produces advantageous effects similar to the advantageous effects produced by the radio-frequency modules 1 and 1a according to the first and second embodiments. In other words, in the radio-frequency module according to the present modification, the third-transmitter circuit elements of the third-transmitter circuit that transmits the third transmit signal based on the third communication standard can be disposed close to the second-transmitter circuit elements of the second-transmitter circuit that transmits the second transmit signal based on the second communication standard. Consequently, communication characteristics of the third transmit signal based on the third communication standard can be improved. For example, when a supply voltage controller that controls the supply voltage for the second-transmitter circuit in accordance with the amplitude level of the second transmit signal is caused to control the supply voltage for the third-transmitter circuit in accordance with the amplitude level of the third transmit signal, the distance between the supply voltage controller and the third-transmitter circuit can be reduced. Thus, waveform rounding of the amplitude waveform of the supply voltage from the supply voltage controller can be reduced with respect to the amplitude waveform of the third transmit signal, and a time lag between the two waveforms can also be reduced. Consequently, the supply voltage provided for the third transmit signal can more precisely be controlled by the supply voltage controller.

Further, in the radio-frequency module according to the present modification, the first-transmitter circuit elements may also include a first power amplifier that amplifies the first transmit signal. Similarly, the second-transmitter circuit elements may include a second power amplifier that amplifies the second transmit signal, and the third-transmitter circuit elements may include a third power amplifier that amplifies the third transmit signal.

The maximum electric power of the second power amplifier and the maximum electric power of the third power amplifier are greater than the maximum electric power of the first power amplifier.

Further, the distance between the third power amplifier and the second power amplifier is shorter than the distance between the third power amplifier and the first power amplifier.

The first-transmitter circuit is not required to include a plurality of first-transmitter circuit elements and may include only one first-transmitter circuit element. In short, it is only required that the first-transmitter circuit include at least one first-transmitter circuit element. Similarly, the first-receiver circuit is not required to include a plurality of first-receiver circuit elements and may include only one first-receiver circuit element. In short, it is only required that the first-receiver circuit include at least one first-receiver circuit element.

If only one first-transmitter circuit element is included, the border region in which the at least one first-transmitter circuit element is disposed refers to a region in which the only one first-transmitter circuit element is disposed in or on a circuit board. Similarly, if only one first-receiver circuit element is included, the border region in which the at least one first-receiver circuit element is disposed refers to a region in which the only one first-receiver circuit element is disposed in or on a circuit board.

Similarly to the first-transmitter circuit, the second-transmitter circuit is not required to include a plurality of second-transmitter circuit elements and may include only one second-transmitter circuit element. In short, it is only required that the second-transmitter circuit include at least one second-transmitter circuit element. Similarly, the second-receiver circuit is not required to include a plurality of second-receiver circuit elements and may include only one second-receiver circuit element. In short, it is only required that the second-receiver circuit include at least one second-receiver circuit element.

If only one second-transmitter circuit element is included, the border region in which the at least one second-transmitter circuit element is disposed refers to a region in which the only one second-transmitter circuit element is disposed in or on a circuit board. Similarly, if only one second-receiver circuit element is included, the border region in which the at least one second-receiver circuit element is disposed refers to a region in which the only one second-receiver circuit element is disposed in or on a circuit board.

Similarly to the first-transmitter circuit, the third-transmitter circuit is not required to include a plurality of third-transmitter circuit elements and may include only one third-transmitter circuit element. In short, it is only required that the third-transmitter circuit include at least one third-transmitter circuit element. Similarly, the third-receiver circuit is not required to include a plurality of third-receiver circuit elements and may include only one third-receiver circuit element. In short, it is only required that the third-receiver circuit include at least one third-receiver circuit element.

If only one third-transmitter circuit element is included, the border region in which the at least one third-transmitter circuit element is disposed refers to a region in which the only one third-transmitter circuit element is disposed in or on a circuit board. Similarly, if only one third-receiver circuit element is included, the border region in which the at least one third-receiver circuit element is disposed refers to a region in which the only one third-receiver circuit element is disposed in or on a circuit board.

In the radio-frequency module according to the present modification, the at least one third-receiver circuit element may be disposed in or on the circuit board in the border region in which the at least one first-receiver circuit element is disposed. In contrast, the at least one third-transmitter circuit element may be disposed in or on the circuit board in the border region in which the at least one second-transmitter circuit element is disposed.

In another modification to the first and second embodiments, the first power amplifier 511 included in the first-transmitter circuit 51 is not required to have two stages and may have one stage or three stages or more. The second power amplifier 611 included in the second-transmitter circuit 61 is not required to have two stages and may have one stage or three stages or more. The third power amplifier 711 included in the third-transmitter circuit 71 is not required to have two stages and may have one stage or three stages or more.

If the second-transmitter circuit 61 includes the second power amplifier 611 having a plurality of stages, that is, the number of stages included in the second power amplifier 611 is more than one, the supply voltage controller 83 may apply the supply voltage not only to the final amplifier 613 but also to other amplifiers. In this case, the supply voltage controller 83 may apply the supply voltage to all the stages in the second power amplifier 611 or to at least two stages in the second power amplifier 611. In short, if the second-transmitter circuit 61 includes the second power amplifier 611 having a plurality of stages, it is only required that the supply voltage controller 83 apply the supply voltage to at least one stage in the second power amplifier 611.

If the third-transmitter circuit 71 includes the third power amplifier 711 having a plurality of stages, that is, the number of stages included in the third power amplifier 711 is more than one, the supply voltage controller 83 may apply the supply voltage not only to the final amplifier 713 but also to other amplifiers. The supply voltage controller 83 may apply the supply voltage to all the stages in the third power amplifier 711 or to at least two stages in the third power amplifier 711. In short, if the third-transmitter circuit 71 includes the third power amplifier 711 having a plurality of stages, it is only required that the supply voltage controller 83 apply the supply voltage to at least one stage in the third power amplifier 711.

The embodiments and modifications described above only represent some of the various embodiments and modifications of the present disclosure. Further, various changes can be made to the embodiments and modifications in accordance with design or the like of the present disclosure.

Summarization

The following aspects are disclosed in accordance with the embodiments and modifications described above.

The radio-frequency module (1 or 1a) according to a first aspect includes the first package (3 or 3a) and the second package (4). The second package (4) differs from the first package (3 or 3a). The first package (3 or 3a) includes the first-transmitter circuit (51) and the first-receiver circuit (52). The first-transmitter circuit (51) transmits the first transmit signal in the first transmit band based on the first communication standard. The first-receiver circuit (52) receives the first receive signal in the first receive band based on the first communication standard. The second package (4) includes the second-transmitter circuit (61) and the second-receiver circuit (62). The second-transmitter circuit (61) transmits the second transmit signal in the second transmit band based on the second communication standard. The second-receiver circuit (62) receives the second receive signal in the second receive band based on the second communication standard. The first package (3 or 3a) further includes the third-receiver circuit (72). The third-receiver circuit (72) receives the third receive signal, which is based on the third communication standard. The third receive signal is in the third receive band that differs from the second receive band and that at least partially overlaps the first receive band. The second package (4) further includes the third-transmitter circuit (71). The third-transmitter circuit (71) transmits the third transmit signal in the third transmit band based on the third communication standard.

In the radio-frequency module (1 or 1a) according to the first aspect, the first package (3 or 3a) includes the third-receiver circuit (72), which receives the third receive signal in the third receive band that at least partially overlaps the first receive band, along with the first-receiver circuit (52), which receives the first receive signal in the first receive band. Consequently, since the first-receiver circuit (52) can also function as the third-receiver circuit (72), the circuit can be downsized.

In the radio-frequency module (1 or 1a) according to the first aspect, the second package (4) includes the third-transmitter circuit (71), which transmits the third transmit signal, along with the second-transmitter circuit (61), which transmits the second transmit signal. Consequently, since the second-transmitter circuit (61) and the third-transmitter circuit (71) can share the supply voltage controller (83), the current efficiency of the transmitter circuits can be improved. For example, when the supply voltage controller (83) is caused to control the supply voltage for the third-transmitter circuit (71) in accordance with the amplitude level of the third transmit signal, the distance between the supply voltage controller (83) and the third-transmitter circuit (71) can be reduced. Thus, waveform rounding of the amplitude waveform of the supply voltage from the supply voltage controller (83) can be reduced with respect to the amplitude waveform of the third transmit signal, and a time lag between the two waveforms can also be reduced. Consequently, the supply voltage provided for the third transmit signal can more precisely be controlled by the supply voltage controller (83).

In the radio-frequency module (1 or 1a) according to a second aspect, the third transmit band in the first aspect differs from the second transmit band and at least partially overlaps the first transmit band.

In the radio-frequency module (1 or 1a) according to a third aspect, the first-transmitter circuit (51) in the first or second aspect includes the first power amplifier (511). The first power amplifier (511) amplifies the first transmit signal. The second-transmitter circuit (61) includes the second power amplifier (611). The second power amplifier (611) amplifies the second transmit signal. The third-transmitter circuit (71) includes the third power amplifier (711). The third power amplifier (711) amplifies the third transmit signal. The maximum electric power of the second power amplifier (611) and the maximum electric power of the third power amplifier (711) are greater than the maximum electric power of the first power amplifier (511).

In the radio-frequency module (1 or 1*a*) according to a fourth aspect, the distance between the third power amplifier (711) and the second power amplifier (611) in the third aspect is shorter than the distance between the third power amplifier (711) and the first power amplifier (511).

In the radio-frequency module (1 or 1*a*) according to a fifth aspect, the distance between the supply voltage controller 83 and the second package (4) in any one of the first aspect to the fourth aspect is shorter than the distance between the supply voltage controller (83) and the first package (3 or 3*a*). The supply voltage controller (83) has a function of controlling the supply voltage for the second-transmitter circuit (61) in accordance with the amplitude level of the second transmit signal.

In the radio-frequency module (1 or 1*a*) according to a sixth aspect, the supply voltage controller (83) in the fifth aspect further has a function of controlling the supply voltage for the third-transmitter circuit (71) in accordance with the amplitude level of the third transmit signal.

In the radio-frequency module (1 or 1*a*) according to a seventh aspect, the first transmit band differs from the second transmit band in any one of the first aspect to the sixth aspect.

In the radio-frequency module (1 or 1*a*) according to an eighth aspect, in any one of the first aspect to the seventh aspect, the first communication standard is the Wi-Fi (registered trademark) standard with the first transmit band being the 5 GHz band, the second communication standard is a wireless mobile communication standard based on cellular technology, and the third communication standard is the eLAA standard.

In the radio-frequency module (1 or 1*a*) according to a ninth aspect, the first-receiver circuit (52) also functions as the third-receiver circuit (72) in any one of the first aspect to the eighth aspect.

The radio-frequency module (1*a*) according to a tenth aspect includes the filter (35) and the switch (31*a*) in any one of the first aspect to the ninth aspect. The filter (35) has a pass band including at least both the first transmit band and the third transmit band. The switch (31*a*) switches between connection and disconnection between the input port of the filter (35) and the output port of the third-transmitter circuit (71).

The radio-frequency module according to an eleventh aspect includes the circuit board, the first-transmitter circuit, the first-receiver circuit, the second-transmitter circuit, the second-receiver circuit, the third-transmitter circuit, and the third-receiver circuit. The first-transmitter circuit includes at least one first-transmitter circuit element disposed in or on the circuit board and transmits the first transmit signal in the first transmit band based on the first communication standard. The first-receiver circuit includes at least one first-receiver circuit element disposed in or on the circuit board and receives the first receive signal in the first receive band based on the first communication standard. The second-transmitter circuit includes at least one second-transmitter circuit element disposed in or on the circuit board and transmits the second transmit signal in the second transmit band based on the second communication standard. The second-receiver circuit includes at least one second-receiver circuit element disposed in or on the circuit board and receives the second receive signal in the second receive band based on the second communication standard. The third-transmitter circuit includes at least one third-transmitter circuit element disposed in or on the circuit board and transmits the third transmit signal in the third transmit band based on the third communication standard. The third-receiver circuit includes at least one third-receiver circuit element disposed in or on the circuit board and receives the third receive signal in the third receive band based on the third communication standard. The third receive band differs from the second receive band and at least partially overlaps the first receive band. The at least one third-receiver circuit element, which is disposed in or on the circuit board, is disposed closer to the border region in which the at least one first-receiver circuit element is disposed than to the border region in which the at least one second-receiver circuit element is disposed. Alternatively, the at least one third-receiver circuit element is disposed in the border region in which the at least one first-receiver circuit element is disposed. The at least one third-transmitter circuit element, which is disposed in or on the circuit board, is disposed closer to the border region in which the at least one second-transmitter circuit element is disposed than to the border region in which the at least one first-transmitter circuit element is disposed. Alternatively, the at least one third-transmitter circuit element is disposed in the border region in which the at least one second-transmitter circuit element is disposed.

In the radio-frequency module according to the eleventh aspect, the at least one third-receiver circuit element, which is disposed in or on the circuit board, is disposed closer to the border region in which the at least one first-receiver circuit element is disposed than to the border region in which the at least one second-receiver circuit element is disposed. Alternatively, the at least one third-receiver circuit element is disposed in the border region in which the at least one first-receiver circuit element is disposed. Consequently, since the first-receiver circuit can also function as the third-receiver circuit, the circuit can be downsized.

Further, in the radio-frequency module according to the eleventh aspect, the at least one third-transmitter circuit element, which is disposed in or on the circuit board, is disposed closer to the border region in which the at least one second-transmitter circuit element is disposed than to the border region in which the at least one first-transmitter circuit element is disposed. Alternatively, the at least one third-transmitter circuit element is disposed in the border region in which the at least one second-transmitter circuit element is disposed. Consequently, since the second-transmitter circuit and the third-transmitter circuit can share the supply voltage controller, the current efficiency of the transmitter circuits can be improved. For example, when the supply voltage controller is caused to control the supply voltage for the third-transmitter circuit in accordance with the amplitude level of the third transmit signal, the distance between the supply voltage controller and the third-transmitter circuit can be reduced. Thus, waveform rounding of the amplitude waveform of the supply voltage from the supply voltage controller can be reduced with respect to the amplitude waveform of the third transmit signal, and a time lag between the two waveforms can also be reduced. Consequently, the supply voltage provided for the third transmit signal can more precisely be controlled by the supply voltage controller.

The communication device (8 or 8*a*) according to a twelfth aspect includes the radio-frequency module (1 or 1*a*) in any one of the first aspect to the eleventh aspect and the supply voltage controller (83). The supply voltage controller (83) has the first function and the second function. The first function controls the supply voltage for the second-transmitter circuit (61) in accordance with the amplitude level of the second transmit signal. The second function controls the supply voltage for the third-transmitter circuit (71) in accordance with the amplitude level of the third transmit signal.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A radio-frequency module comprising:
   a first circuit package; and
   a second circuit package,
   wherein the first circuit package comprises:
      a first transmitter circuit configured to transmit a first transmit signal in a first transmit band based on a first communication standard;
      a first receiver circuit configured to receive a first receive signal in a first receive band based on the first communication standard; and
      a third receiver circuit configured to receive a third receive signal in a third receive band based on a third communication standard,
   wherein the second circuit package comprises:
      a second transmitter circuit configured to transmit a second transmit signal in a second transmit band based on a second communication standard;
      a second receiver circuit configured to receive a second receive signal in a second receive band based on the second communication standard; and
      a third transmitter circuit configured to transmit a third transmit signal in a third transmit band based on the third communication standard, and
   wherein the third receive band is different than the second receive band, and the third receive band at least partially overlaps the first receive band.

2. The radio-frequency module according to claim 1, wherein the third transmit band is different than the second transmit band, and the third transmit band at least partially overlaps the first transmit band.

3. The radio-frequency module according to claim 1, wherein:
   the first-transmitter circuit comprises a first power amplifier configured to amplify the first transmit signal,
   the second-transmitter circuit comprises a second power amplifier configured to amplify the second transmit signal,
   the third-transmitter circuit comprises a third power amplifier configured to amplify the third transmit signal, and
   a maximum electric power of the second power amplifier and a maximum electric power of the third power amplifier are each greater than a maximum electric power of the first power amplifier.

4. The radio-frequency module according to claim 3, wherein, as physically arranged in the radio-frequency module, a distance between the third power amplifier and the second power amplifier is shorter than a distance between the third power amplifier and the first power amplifier.

5. The radio-frequency module according to claim 1, wherein:
   as physically arranged in the radio-frequency module, a distance between a supply voltage controller and the second circuit package is shorter than a distance between the supply voltage controller and the first circuit package, and
   the supply voltage controller is configured to control a supply voltage for the second transmitter circuit in accordance with an amplitude level of the second transmit signal.

6. The radio-frequency module according to claim 5, wherein the supply voltage controller is further configured to control a supply voltage for the third transmitter circuit in accordance with an amplitude level of the third transmit signal.

7. The radio-frequency module according to claim 1, wherein the first transmit band is different than the second transmit band.

8. The radio-frequency module according to claim 1, wherein:
   the first communication standard is a Wi-Fi standard and the first transmit band is a 5 GHz band,
   the second communication standard is a wireless mobile communication standard based on cellular technology, and
   the third communication standard is an enhanced Licensed Assisted Access (eLAA) standard.

9. The radio-frequency module according to claim 1, wherein the first receiver circuit and the third-receiver circuit are the same circuit.

10. The radio-frequency module according to claim 1, further comprising:
    a filter having a pass band that comprises the first transmit band and the third transmit band; and
    a switch configured to selectively connect an input port of the filter to an output port of the third-transmitter circuit.

11. A radio-frequency module comprising:
    a circuit board;
    a first transmitter circuit in or on the circuit board and configured to transmit a first transmit signal in a first transmit band based on a first communication standard;
    a first receiver circuit in or on the circuit board and configured to receive a first receive signal in a first receive band based on the first communication standard;
    a second transmitter circuit in or on the circuit board and configured to transmit a second transmit signal in a second transmit band based on a second communication standard;
    a second receiver circuit in or on the circuit board and configured to receive a second receive signal in a second receive band based on the second communication standard;
    a third transmitter circuit in or on the circuit board and configured to transmit a third transmit signal in a third transmit band based on a third communication standard; and
    a third receiver circuit in or on the circuit board and configured to receive a third receive signal in a third receive band based on the third communication standard, wherein the third receive band is different than the second receive band and at least partially overlaps the first receive band, wherein an element of the third receiver circuit is physically arranged closer to an element of the first receiver circuit than to an element of the second receiver circuit, and wherein the element of the third-transmitter circuit is physically arranged closer to the element of the second-transmitter circuit than to the element of the first-transmitter circuit.

12. A communication device according to claim 11, wherein:

the first communication standard is a Wi-Fi standard and the first transmit band is a 5 GHz band, the second communication standard is a wireless mobile communication standard based on cellular technology, and the third communication standard is an enhanced Licensed Assisted Access (eLAA) standard.

13. A communication device comprising:
the radio-frequency module according to claim 1; and
a supply voltage controller,
wherein the supply voltage controller is configured to:
control a supply voltage for the second-transmitter circuit in accordance with an amplitude level of the second transmit signal, and
control a supply voltage for the third-transmitter circuit in accordance with an amplitude level of the third transmit signal.

14. A communication device comprising:
the radio-frequency module according to claim 11; and
a supply voltage controller,
wherein the supply voltage controller is configured to:
control a supply voltage for the second-transmitter circuit in accordance with an amplitude level of the second transmit signal, and
control a supply voltage for the third-transmitter circuit in accordance with an amplitude level of the third transmit signal.

* * * * *